(No Model.)

C. T. HURD.
PIE BAKING PLATE.

No. 254,770.                Patented Mar. 7, 1882.

Witnesses
A. L. Ourand
Jas. L. Falby

Inventor
Chas. T. Hurd
By H. T. Ennis
Atty.

UNITED STATES PATENT OFFICE.

CHARLES T. HURD, OF PEORIA, ILLINOIS.

PIE-BAKING PLATE.

SPECIFICATION forming part of Letters Patent No. 254,770, dated March 7, 1882.

Application filed August 11, 1881. (No model.)

*To all whom it may concern:*

Be it known that I, C. T. HURD, a citizen of the United States, residing at Peoria, in the county of Peoria and State of Illinois, have invented certain new and useful Improvements in Pie-Baking Plates; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
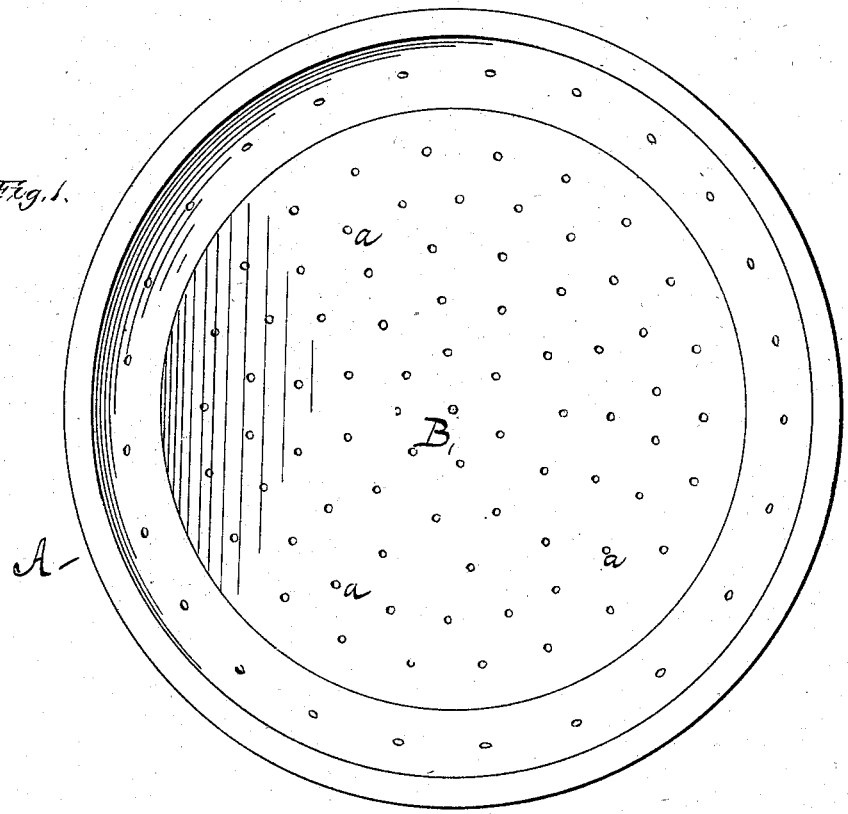
Figure 2:
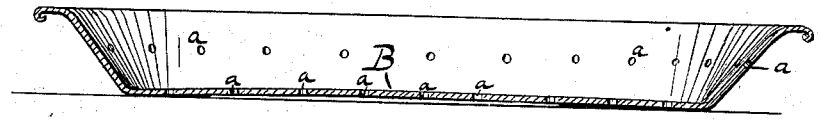

Figure 1 is a top plan view of my improved pie-plate, and Fig. 2 a section elevation of the same.

In the accompanying drawings, similar letters of reference marked thereon indicate like parts of the invention.

A is a pie-plate of the ordinary form and dimensions, provided over its entire surface with a series of perforations or holes, $a$. The bottom B of the pan is slightly concave, as seen in Fig. 2, and when the dough is placed in the pan and the pan in the oven the moisture in the lower crust will be driven out through the perforations $a$ into the concavity formed between the bottom of the pan and the oven, and will thence escape into the air.

The whole invention lies in making a pie-plate or similar culinary utensil out of a single piece of foraminous sheet metal and giving a slight concavity to its bottom, as shown.

The operation of the device will be fully understood from the foregoing.

I am aware that baking-pans and the like have been perforated for a like purpose; but such have either been provided with legs to keep the bottom from the oven, or the bottom has rested on the floor of the oven, and thus defeated the objects sought to be attained.

I am aware that perforated culinary utensils are used, as shown in Patents Nos. 73,703 and 114,444, and such I do not broadly claim.

Having thus fully described my invention, what I claim as new and useful, and desire to secure by Letters Patent of the United States, is—

As a new article of manufacture, a pie-plate or analogous culinary utensil made of a single piece of foraminous material and provided with a concave bottom, substantially as shown and described.

In testimony whereof I affix my signature in presence of two witnesses.

CHARLES T. HURD.

Witnesses:
S. R. HENDERSON,
J. T. HARRIS.